United States Patent
Barnes et al.

(10) Patent No.: US 8,495,710 B2
(45) Date of Patent: Jul. 23, 2013

(54) PORT TAPPING FOR SECURE ACCESS

(75) Inventors: David A. Barnes, Winchester (GB);
Andrew J. Parker, Thatcham (GB);
Steven Wright, Upham (GB); Inga J. Chapman, legal representative, Upham (GB)

(73) Assignee: International Business Machines Corporation, Armonk, NY (US)

( * ) Notice: Subject to any disclaimer, the term of this patent is extended or adjusted under 35 U.S.C. 154(b) by 82 days.

(21) Appl. No.: 12/636,625

(22) Filed: Dec. 11, 2009

(65) Prior Publication Data
US 2011/0145910 A1 Jun. 16, 2011

(51) Int. Cl.
*H04L 29/06* (2006.01)

(52) U.S. Cl.
USPC ..................................... 726/4; 726/5; 726/29

(58) Field of Classification Search
None
See application file for complete search history.

(56) References Cited

U.S. PATENT DOCUMENTS

| | | | |
|---|---|---|---|
| 7,380,123 B1 * | 5/2008 | Hernacki et al. | 713/168 |
| 7,383,366 B2 * | 6/2008 | Friedlander et al. | 710/62 |
| 7,594,268 B1 * | 9/2009 | Sobel | 726/23 |
| 2008/0016166 A1 * | 1/2008 | Beverly et al. | 709/206 |

OTHER PUBLICATIONS

Krzywinski, "Resources—Links to related and background articles, guides, standards, documents, sites, and books", http://www.portknocking.org/view/resources, Accessed Apr. 25, 2011.*
Jeanquier, "An Analysis of Port Knocking and Single Packet Authorization", MSc Thesis, Sep. 9, 2006, Royal Holloway, University of London, Information Security Group.*
Krzywinski, "Port Knocking—Network Authentication Across Closed Port", Jun. 2003, Sys Admin, vol. 12, No. 6, pp. 12-17.*
DeGraaf, et al., "Improved Port Knocking with Strong Authentication" in Proc. of the 21st Annual Computer Security Applications Conference, Tucson, AZ, Dec. 2005, pp. 409-418.*
R. deGraaf, "Enhancing Firewalls: Conveying User and Application Identification to Network Firewalls", M.S. Thesis for The University of Calgary, May 2007, Online: http://recursos.aldabaknocking.com/thesis-degraaf.pdf.*
M. Doyle, "Implementing a Port Knocking System in C", Honors Thesis for The University of Arkansas, 2004, Online: http://portknocking.sourceforge.net/files/Implementing%20a%20Port%20 Knocking%20System%20in%20C.pdf.*
M. Krzywinski, "Port Knocking", WCSF 2003, Nov. 17, 2003, Online: http://www.portknocking.org/docs/wcsf2003.pdf.*
M. Krzywinski, "Port Knocking from the inside out", hakin9, May 2005, Online: http://www.portknocking.org/docs/portknocking_an_introduction.pdf.*
D. Isabel, "Port Knocking: Beyond the Basics," SANS Institute, InfoSec Reading Room, Mar. 9, 2005, Retrieved Jul. 27, 2012, Online: http://www.sans.org/reading_room/whitepapers/sysadmin/port-knocking-basics_1634.*

(Continued)

*Primary Examiner* — Jung Kim
*Assistant Examiner* — Robert Leung
(74) *Attorney, Agent, or Firm* — Kenneth L. Sherman, Esq.; Michael Zarrabian, Esq.; Sherman & Zarrabian LLP (57) ABSTRACT

Secure access in a computing environment is provided. One implementation involves a client generating a sequence for tapping server ports, and the client identifying itself to the server by tapping the server ports based on the sequence. The server verifies if the tapping sequence is correct. If the tapping sequence is correct, access is provided from the client to the server.

17 Claims, 4 Drawing Sheets

OTHER PUBLICATIONS

The TCP/IP Guide, "Connection-Oriented and Connectionless Protocols," Sep. 20, 2005, 2 pages, Retrieved Jul. 27, 2012, Online: http://www.tcpipguide.com/free/t_ConnectionOrientedandConnectionlessProtocols.htm.* deGraaf, et al. "Improved Port Knocking with Strong Authentication" in Proc. of the 21st Annual Computer Security Applicationis Conference, Tucson, AZ, Dec. 2005, pp. 409-418.*

M. Krzywinski, "Port Knocking—Network Authentication Across Closed Port," Jun. 2003, Sys Admin, vol. 12, No. 6, pp. 12-17.*

M. Krzywinski, "Port Knocking," WCSF 2003, Nov. 17, 2003.*

PCWORLD.COM, Steve Gibson's ShieldsUp, "Hide Your Internet Ports From Snooping Hackers," downloaded Jan. 19, 2009 from http://pcworld.about.com/magazine/2305p168id119996.htm., USA.

Gibson Research Corporation, ShieldsUp!—Internet Vulnerability Profiling, downloaded Jan. 19, 2009 at https://www.grc.com/x/ne.dII?bh0bkyd2, Laguna Hills, CA.

* cited by examiner

PORT TAPPING FOR SECURE ACCESS

BACKGROUND

The invention relates generally to secure access in a computing environment, and in particular, to secure access via ports.

With the proliferation of information technology systems, there is increasing interest in providing interfaces between computers and peripheral devices. Ports are used in computer systems to interface devices, wherein each port is an electronic signal interface between such devices. Software ports (e.g., such as Transmission Control Protocol in Internet Port) are virtual connections for programs to perform direct information exchange. However, opening a port on a computer potentially allows a hacker an initial attack point.

BRIEF SUMMARY

Secure access in a computing environment is provided. One embodiment comprises a client generating a sequence for tapping server ports. The client identifies itself to the server by tapping the server ports based on the sequence. The server verifies if the tapping sequence is correct, and allows access from the client to the server if the tapping sequence is correct.

Further, a computer program product provides secure access in a computing environment. The computer program product comprises a computer readable medium having a computer usable program code embodied therewith. The computer usable program code comprises computer usable program code configured to, at a client, generate a sequence for tapping server device ports, and identify the client to the server device by tapping the server device ports based on the sequence. The computer usable program code further comprises computer usable program code configured to, at the server device, verify if the tapping sequence is correct, and allow access from the client to the server device if the tapping sequence is correct.

Further, a system for providing secure access in a computing environment comprises a client configured for generating a sequence for tapping server device ports, and the client identifying itself to the server device by tapping the server device ports based on the sequence. The system further comprises a server device configured for verifying if the tapping sequence is correct, and allowing access from the client to the server device if the tapping sequence is correct.

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Unique port tapping is provided for secure access in a computing environment. An embodiment comprises establishing credentials of a client module (e.g., client application) to a server module (e.g., server application) using port tapping, in a computing environment. Tapping a port comprises a client attempting to access a server on a server port.

Figure 1:
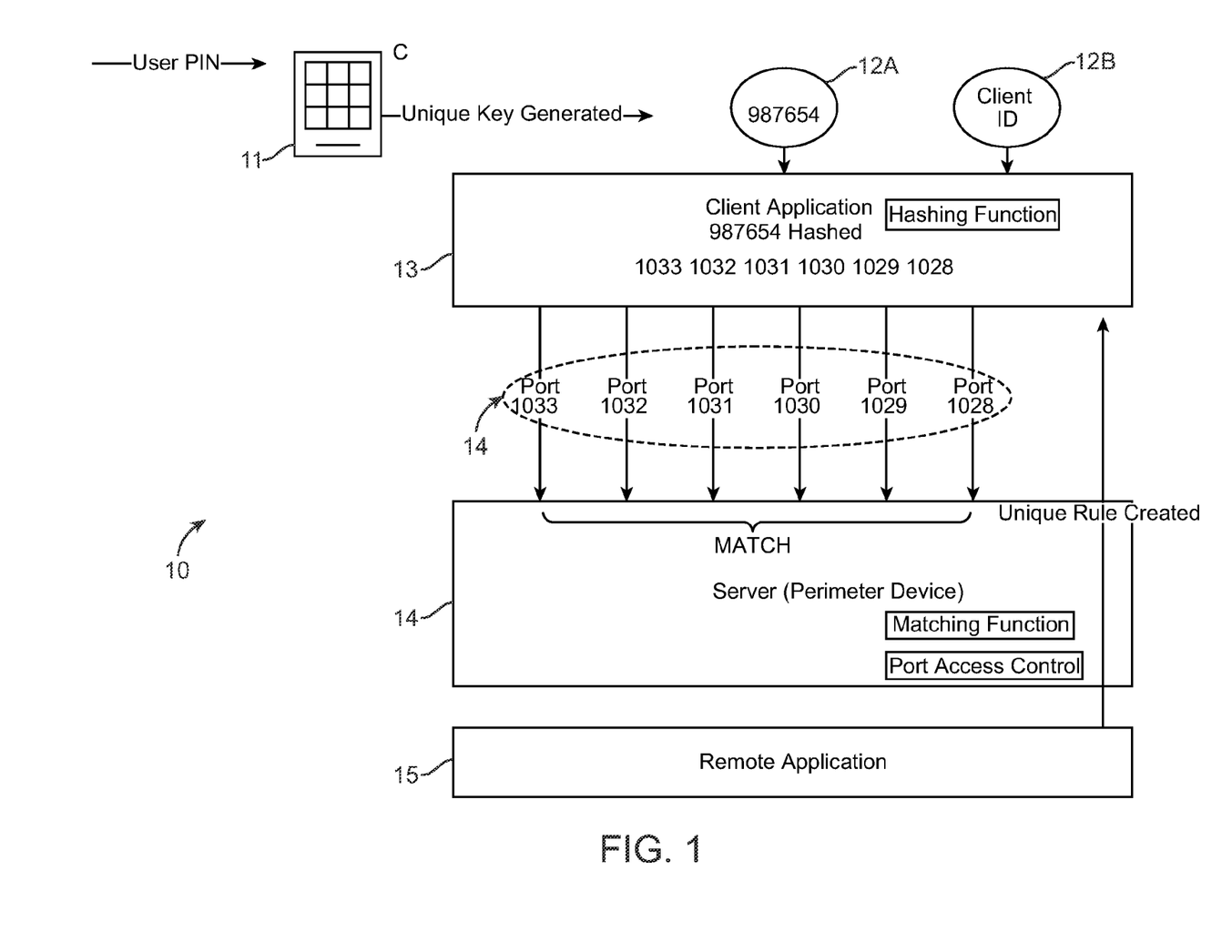
FIG. 1 shows a functional block diagram of a system with unique port tapping for secure access in a computing environment, according to an embodiment of the invention.

FIG. 1 shows a functional block diagram of a system 10 implementing an embodiment of the invention. Port tapping is utilized to provide a unique port for an initial sign-on access, and then if the port tapping is in the correct sequence, a firewall rule is generated to be unique for client access. A port tapping sequence is randomly generated using an identification generator 11. The identification generator 11 takes as input user identification or personal identification number (PIN), and generates a unique pseudo-random number key that changes periodically and is time-synched to an available server such as a perimeter device 14. The unique key comprises a onetime login password 12A. The password 12A is entered into a client application 13 and a predefined Client ID 12B is also entered into the client application 13. The Client ID is used to uniquely identify the actual entity performing the authentication.

A hashing function of the client application 13 converts the combination of password 12A and Client ID 12B to a set of port numbers 14. The client application 13 then "taps" the port numbers into each port of the server 14. A matching function of the server 14 determines if the port numbers match a known sequence based on a predefined algorithm and time that is known to both the client and the server. If matches are found, then a port access control function of the server 14 allows the client application 13 access. In one example, a remote application 15 is a target of the access, wherein remote application 15 may comprise, e.g., corporate network or an email application. A new firewall rule may be generated based on IP address of the client 13, or access to another port may be allowed.

Figure 2:
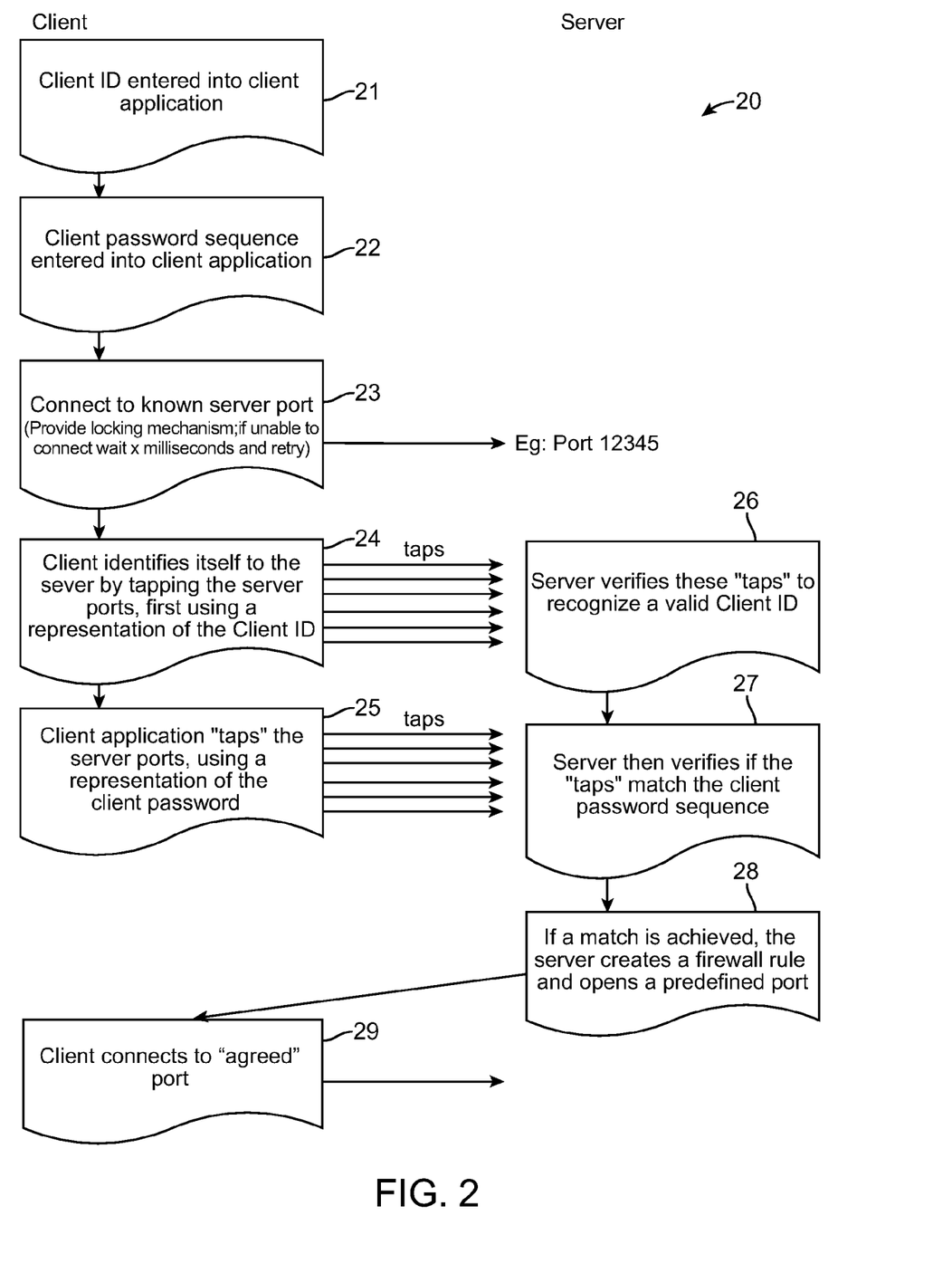
FIG. 2 shows a flowchart of a process implementing unique port tapping for secure access in a computing environment, according to an embodiment of the invention.

FIG. 2 shows a flowchart of a process 20 for unique port tapping for secure access in a computing environment, according to an embodiment of the invention. The process 20 includes the following process blocks:

Block 21: On a client such a client device, a client application such as a virtual private network (VPN) is stated, and a predefined Client ID is entered into the application.

Block 22: The client password sequence is entered into the client application.

Block 23: The client application connects to a known port (e.g., port 12345) of a server port as a mechanism to prevent multiple client applications connecting at once (other methods may be utilized to enable multiple use). If unable to connect, then a retry is attempted in, e.g., x milliseconds.

Block 24: Upon connection to the port, the client application identifies itself to the server by tapping the server ports, first using a representation of the Client ID.

Block 25: The client application then "taps" the server ports, using a representation of the client password (e.g., a combination unlock sequence). The client application converts the combination of Client ID and client password to a series of port numbers, and "taps" each server port in turn, effectively as punching the keys on a cipher lock.

Block 26: Server application verifies these "taps" to recognize a valid Client ID. The server application "sees" the taps as attempts for accessing the series of ports and using predefined algorithms works out if the tapping order corresponds to a valid Client ID and client password.

Block 27: The server application then verifies if a correct tapping sequence has been entered (e.g., verifies if the tapping sequence matched an expected tapping sequence). In one example, the server application detects if the client application "taps" match the client password sequence. If a correct combination of Client ID and password has been entered, then a protocol is established to allow the client to access the server.

Block 28: If a match is achieved in block 27, the server application creates a firewall rule and opens a predefined port to allow the client access to the server.

Block 29: The client application connects to a predefined ("agreed") access port. The client application uses the predefined access port to connect to the server.

Figure 3:
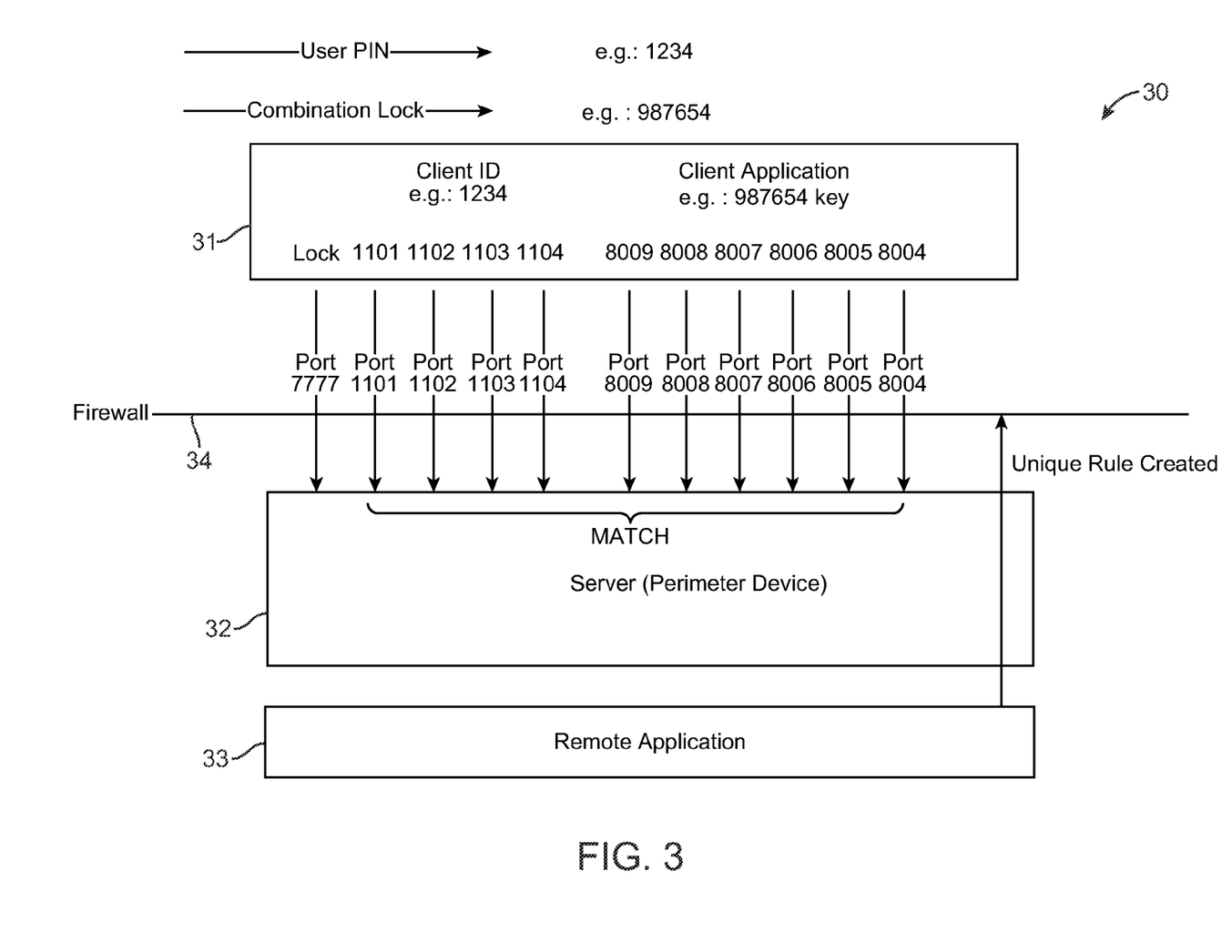
FIG. 3 shows a block diagram of a system with unique port tapping for secure access in a computing environment, according to an embodiment of the invention.

FIG. 3 shows another example of a port tapping system 30 for secure access according to the invention. A set of open ports are used to provide a mechanism analogous to a combination lock, for a client application 31 to access a server 32 when the server ports are tapped in the proper sequence. The remote application 34 is a representation of the target of access by the client 31 (e.g., this maybe access to a corporate network or perhaps an email application). The sequence is recognized by the server 14 to initially provide such access. The combination lock mechanism provides a port tapping sequence, wherein the sequence itself may be generated by an identification generator.

To prevent a clash between two client applications signing on for access at once, a well known port of the server 32 is used as a locking mechanism before using the combination sequence (i.e., combination of password and Client ID converted to a set of port numbers that are tapped in sequence by the client application). When the server 32 detects the proper tapping sequence, then the server 32 allows the client application 31 access to the server 32.

The Client ID is entered into the client application 31 and a password combination sequence is also entered into the client application 31. The client application 31 connects to a predefined well known server port to "lock" out other client applications, wherein only one client application at a time may provide the Client ID and combination sequence to the server 32 via tapping. The client application identifies 31 itself to the server 32 by tapping the server ports using a representation of the Client ID (this may be a subset of available ports).

Then, the client application 31 taps the server ports, using a representation of the combination sequence. The server 32 then verifies these taps to recognize a valid Client ID. The server 32 then verifies if the "taps" match an expected client combination lock sequence. If a match is achieved, the server 32 creates a firewall rule 34 and opens a predefined port for the client application 31. The predefined port is then used by the client application 31 to create a communication pipe between the client application 31 and the server 32, wherein the communication pipe may or may not be encrypted.

In one example for Internet Port (IP) tapping, client credentials authentication is associated with a password. The password is preferably a secure identification generated by a time dependent identification generator (e.g., SecureID, Watchword, Racal), but it may also be a static password. Ports are preferably open ports, but may also be closed ports. Port locking is applied so that port tapping is not interrupted. If a password is authenticated, then the server creates a firewall rule and opens a predefined port. The function of the firewall rule is to only expose the open port to the client (source Address) which was successfully authenticated.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Figure 4:
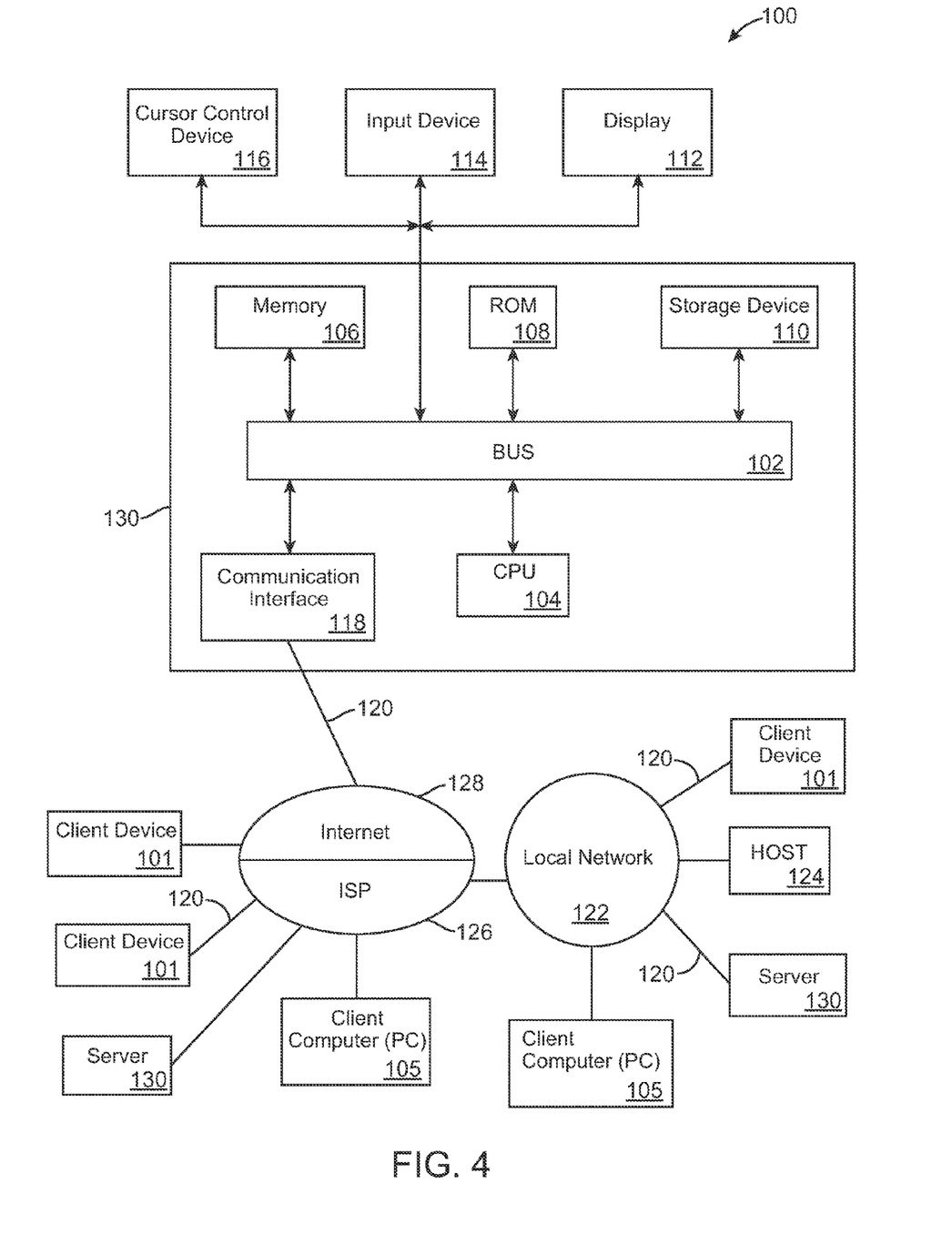
FIG. 4 shows a block diagram of an example computing environment capable of implementing an embodiment of the invention.

FIG. 4 shows a block diagram of an example architecture of an embodiment of a system 100 configured to perform the processes described above, according to an embodiment of the invention. The system 100 includes one or more client devices 101 connected to one or more server computing systems 130. A server 130 includes a bus 102 or other communication mechanism for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type or user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing computer usable program code such as software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, which allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 104 for execution. Such a medium may take many forms, including but not limited to, non-volatile media, volatile media, and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise a USB/Tuner and the network link 120 may be an antenna or cable for connecting the server 130 to a cable provider, satellite provider or other terrestrial transmission system for receiving messages, data and program code from another source.

The example versions of the invention described herein are implemented as logical operations in a distributed processing system such as the system 100 including the servers 130. The logical operations of the present invention can be implemented as a sequence of steps executing in the server 130, and as interconnected machine modules within the system 100. The implementation is a matter of choice and can depend on performance of the system 100 implementing the invention. As such, the logical operations constituting said example versions of the invention are referred to for e.g., as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of providing secure access in a computing environment, comprising:
    a client generating a first sequence for tapping server device ports based on a client identification (ID) and generating a second sequence for tapping the server device ports based on a client password;
    the client connecting to a known server port, wherein the client initially connects to the known port of the server device in order to prevent multiple clients from connecting at once;
    the client tapping the server device ports with the first tapping sequence based on the client ID;
    the server device verifying if the first tapping sequence correctly matches a first expected port tapping combination for a valid client ID;
    the client additionally tapping the server device ports with the second tapping sequence after the client ID is verified, wherein the server detects the second tapping sequence as port access attempts; and
    the server device verifying if the second tapping sequence correctly matches an expected port tapping unlock combination, and authenticating the client password and granting access from the client to a predefined port of the server device if the second tapping sequence correctly matches the expected port tapping unlock combination.

2. The method of claim 1 wherein generating the first sequence and the second sequence for tapping server device ports further comprises:
    generating a first sequence of port numbers to tap each port in a specific order based on a conversion of the client ID to a first combination of port numbers; and
    generating a second sequence of port numbers to tap each port in a specific order based on a generated unique key comprising a second combination of port numbers based on the client password.

3. The method of claim 2 wherein the first tapping sequence is generated based on the client ID being input to an identification generator and the output from the identification generator comprises a unique pseudo-random number key that changes periodically.

4. The method of claim 3 wherein the server device verifying if the tapping sequence is correct further comprises:
    the server device detecting if the first tapping sequence matches a predefined protocol corresponding to a valid client identification and if the second tapping sequence matches a predefined protocol corresponding to a valid client password.

5. The method of claim 4 further comprising:
    the server device creating a firewall rule and opening a predefined port to allow access to the client.

6. The method of claim 5 further comprising:
    the client accessing the server device using the predefined port based on the firewall rule.

7. A computer program product for providing secure access in a computing environment, said computer program product comprising:
    a non-transitory computer readable medium having a computer usable program code embodied therewith, the computer usable program code comprising:
    computer usable program code configured for a client to generate a first unlock sequence for tapping server device ports based on a client identification (ID), generate a second unlock sequence for tapping the server device ports based on a client password, connect the client to a known port, wherein the client initially connects to the known port of the server device in order to prevent multiple clients from connecting at once, tap the server device ports with the first unlock sequence based on the client ID, and additionally tap the server device ports with the second unlock sequence after the client ID is verified, wherein the server detects taps for the second sequence as port access attempts; and computer usable program code configured to, at the server device, verify if the first tapping unlock sequence correctly matches a first expected port tapping combination for a valid client ID, and additionally verify if the second tapping unlock sequence correctly matches a second expected port tapping combination, and authenticate the client password and grant access from the client to a predefined port of the server device if the first tapping unlock sequence correctly matches the first expected port tapping combination and the second tapping unlock sequence correctly matches the second expected port tapping combination.

8. The computer program product of claim 7 further comprising:

computer usable program code for generating a first sequence of port numbers to tap each port in a specific order based on a conversion of the client ID to a first combination of port numbers and for generating a second sequence of port numbers to tap each port in a specific order based on a conversion of the client password to a second combination of port numbers.

9. The computer program product of claim 8 further comprising:

computer usable program code configured for the server device to verify if the tapping sequence is correct by determining that the taps correspond to a valid client identification.

10. The computer program product of claim 9 further comprising:

computer usable program code configured for the server device to detect if the tapping sequence matches a predefined protocol corresponding to a valid client identification and a one-time client password.

11. The computer program product of claim 10 further comprising:

computer usable program code configured for the server device to create a firewall rule and open a predefined port to allow access to the client.

12. The computer program product of claim 11 further comprising: computer usable program code configured for the client to access the server device using the predefined port.

13. A system for providing secure access in a computing environment, comprising:

a client; and a server device;

wherein the client generates a first sequence for tapping server device ports based on a conversion of a client identification (ID) to a first pseudo-random combination sequence of port numbers, and generates a second sequence for tapping the server device ports based on a conversion of a client password to a second pseudo-random combination sequence of port numbers, the client connecting to a known port, wherein the client initially connects to the known port of the server device in order to prevent multiple clients from connecting at once, tapping the server device ports with the first combination sequence of port numbers based on the client ID, and the client additionally tapping the server device ports with the second combination sequence of port numbers after the client ID is verified, wherein a server device detects the second tapping sequence as port access attempts; and wherein the server device verifies if the first tapping combination sequence of port numbers is correct, verifying if the second tapping combination sequence of port numbers is correct, authenticating the client password and granting access from the client to a predefined port of the server device if both the first tapping combination sequence of port numbers and the second tapping combination sequence of port numbers are correct.

14. The system of claim 13 wherein the client generates a first sequence of port numbers to tap each port in a particular order based on the client ID and generates a second sequence of port numbers to tap each port in a particular order based on the client password.

15. The system of claim 14 wherein the client identification is used for generating a unique pseudo-random number key that changes periodically.

16. The system of claim 15 wherein the server device detects if the first tapping sequence matches a predefined protocol corresponding to a valid client identification and the second tapping sequence matches a predefined protocol corresponding to a valid client password.

17. The system of claim 16 wherein the server device creates a firewall rule and opening a predefined port to allow access to the client.

* * * * *